(12) United States Patent
Daurelle et al.

(10) Patent No.: US 8,219,348 B2
(45) Date of Patent: Jul. 10, 2012

(54) METHOD FOR CALIBRATING AND/OR CORRECTING A DISPLAY DEVICE HAVING A NEEDLE, THE NEEDLE BEING ABLE TO MOVE IN ROTATION ABOUT AN AXIS OF ROTATION

(75) Inventors: Jean-Yves Daurelle, Paris (FR); Jean-Claude Lemoult, Cherre (FR)

(73) Assignee: Johnson Controls Technology Company, Holland, MI (US)

( * ) Notice: Subject to any disclaimer, the term of this patent is extended or adjusted under 35 U.S.C. 154(b) by 323 days.

(21) Appl. No.: 12/691,093

(22) Filed: Jan. 21, 2010

(65) Prior Publication Data

US 2010/0211344 A1    Aug. 19, 2010

(30) Foreign Application Priority Data

Jan. 22, 2009  (FR) ...................................... 09 00283
Jan. 22, 2009  (FR) ...................................... 09 00284

(51) Int. Cl.
   *G01C 17/38* (2006.01)
(52) U.S. Cl. ........................................................ 702/94
(58) Field of Classification Search .................... 702/94, 702/85; 396/296, 374; 73/1.01, 1.88
   See application file for complete search history.

(56) References Cited

U.S. PATENT DOCUMENTS

| 5,205,635 | A |   | 4/1993  | Van Order et al. |
|-----------|---|---|---------|------------------|
| 5,515,128 | A | * | 5/1996  | Wakabayashi et al. ........ 396/296 |
| 5,665,897 | A |   | 9/1997  | Lippmann |
| 5,803,240 | A |   | 9/1998  | Swidersky et al. |
| 5,847,475 | A |   | 12/1998 | Rauch et al. |
| 6,145,369 | A | * | 11/2000 | Corbin et al. .................. 73/1.88 |
| 6,417,779 | B1 |  | 7/2002  | Noll et al. |
| 6,598,988 | B1 |  | 7/2003  | Noll et al. |
| 6,817,610 | B2 |  | 11/2004 | Suglyama et al. |
| 7,098,897 | B2 |  | 8/2006  | Vakil et al. |
| 7,221,363 | B2 |  | 5/2007  | Roberts et al. |
| 2005/0052426 | A1 | | 3/2005 | Hagermoser et al. |
| 2005/0134485 | A1 | | 6/2005 | Hein et al. |
| 2006/0035073 | A1 | | 2/2006 | Funkenbusch et al. |
| 2006/0132383 | A1 | | 6/2006 | Gally et al. |
| 2010/0058976 | A1 | | 3/2010 | Mayer et al. |

FOREIGN PATENT DOCUMENTS

| DE | 839104 C    | 5/1952 |
| DE | 3149826 A1  | 7/1983 |
| DE | 4125724 A1  | 2/1991 |
| DE | 4321146 A1  | 1/1995 |
| DE | 19544578 A1 | 6/1997 |
| DE | 19737679 A1 | 3/1999 |

(Continued)

OTHER PUBLICATIONS

U.S. Appl. No. 12/692,743, filed Feb. 2, 2010, Frens.

(Continued)

*Primary Examiner* — Bryan Bui
(74) *Attorney, Agent, or Firm* — Dobrusin & Thennisch PC

(57) ABSTRACT

The present invention relates to a method for calibrating and/or correcting a display device having a needle, the needle being able to move in rotation about an axis of rotation and the needle being driven by means of a stepping motor, the calibration method including several measurements of differences between a value displayed and a value to be displayed, and a computation of a correction value as a function of the differences.

14 Claims, 1 Drawing Sheet

FOREIGN PATENT DOCUMENTS

| | | | |
|---|---|---|---|
| DE | 19739628 A1 | 3/1999 |
| DE | 19831893 A1 | 1/2000 |
| DE | 20021111 U1 | 1/2001 |
| DE | 10134365 A1 | 1/2003 |
| DE | 102005003919 A1 | 9/2005 |
| DE | 102005055906 A1 | 5/2007 |
| DE | 102007018523 A1 | 10/2008 |
| EP | 0571759 A2 | 4/1993 |
| EP | 0666643 A1 | 9/1995 |
| EP | 1720021 A1 | 4/2006 |
| EP | 1758070 A2 | 2/2007 |
| EP | 1839945 A1 | 10/2007 |
| EP | 2110834 A1 | 10/2009 |
| FR | 2679988 A1 | 2/1993 |
| FR | 2871230 A1 | 12/2005 |
| JP | 2003014508 A | 1/2003 |
| WO | 01/65569 A1 | 9/2001 |
| WO | 2004/102127 A1 | 11/2004 |
| WO | 2006/002474 A1 | 1/2006 |
| WO | 2006/005821 | 1/2006 |
| WO | 2008/086215 A2 | 7/2008 |
| WO | 2008/131305 A1 | 10/2008 |
| WO | 2009/150546 A2 | 12/2009 |
| WO | 2010/025160 A1 | 4/2010 |

OTHER PUBLICATIONS

U.S. Appl. No. 12/521,846, filed Jan. 4, 2008, Pierce et al.
U.S. Appl. No. 12/528,214, filed Aug. 21, 2009, Mayer
French Search Report dated Jan. 22, 2009; FR0900283.

* cited by examiner

METHOD FOR CALIBRATING AND/OR CORRECTING A DISPLAY DEVICE HAVING A NEEDLE, THE NEEDLE BEING ABLE TO MOVE IN ROTATION ABOUT AN AXIS OF ROTATION

CLAIM OF BENEFIT OF FILING DATE

The present application claims the benefit of the filing date of FR Application Serial No. 09/00283, filed Jan. 22, 2009 and FR Application Serial No. 09/00284, filed Jan. 22, 2009, the contents of which are hereby incorporated by reference in their entirety.

The present invention relates to a method for calibrating and/or correcting a display device having a needle, the needle being able to move in rotation about an axis of rotation.

Methods for calibrating and/or correcting a display device are known, particularly from the German patent application DE 10 2005 055 906 A1. This document proposes a compensation or a calibration of a display device having a needle comprising a ring. On this ring, a location element is provided so that the display device can—for example with the aid of an optical sensor or with the aid of a magnetic sensor—ascertain its adjustment position, for example the display device can ascertain its point of departure.

It is evident that a restriction on the shape of the needle as proposed in this document of the prior art constitutes a drawback. Moreover, another drawback of such a solution according to the prior art consists in the necessity of providing a location element and means for processing the signals of an optical or magnetic sensor increases the cost price of such a display device.

For the display devices that undergo a calibration or a correction between the values displayed and the values to be displayed, a correction carried out prior to the sale of the display device to an end customer, notably prior to the display device being mounted in a vehicle, the time for carrying out such a calibration or correction must be minimized because it is a considerable factor in the costs of producing such display devices. For this reason, a compromise between an optimal calibration or optimal correction of the display device on the one hand (requiring considerable time and effort for the calibration) and a reasonable time and effort for carrying out the calibration or the correction on the other hand should be aimed at.

The particular object of the present invention is to alleviate the drawbacks of the prior art, and notably those cited above, and a further object is to propose a method for calibrating and/or correcting a display device that is more reliable and more rapid.

According to a first embodiment of the present invention, this object is achieved by a method for calibrating and/or correcting a display device having a needle, the needle being able to rotate about an axis of rotation and the needle being driven by means of a stepping motor, the calibration method comprises the following steps:

a first measurement of a first difference between a first value displayed by the needle and a first value to be displayed by the needle, a second measurement of a second difference between a second value displayed by the needle and a second value to be displayed by the needle, a third measurement of a third difference between a third value displayed by the needle and a third value to be displayed by the needle, a fourth measurement of a fourth difference between a fourth value displayed by the needle and a fourth value to be displayed by the needle, a computation of a correction value as a function of the first difference, the second difference, the third difference and the fourth difference, the correction value corresponding to a polynomial function of at least the third degree.

Through such an embodiment of the method for calibrating and/or correcting a display device, it is advantageously possible to minimize the time necessary to carry out the calibration while reducing the error between the values displayed and the values to be displayed. The result of this is that the cost price for producing such display devices can be reduced and the number of parts produced or calibrated per unit of time can be increased.

Another preferred enhancement of the invention lies in the fact that the polynomial function takes the form $$\text{correction value} = A3 * \theta 3 + A2 * \theta 2 + A1 * \theta + A0$$

$\theta$ being the angle displayed relative to the origin of the gauge and A0, A1, A2, A3 and A4 being constants.

Another preferred enhancement of the invention lies in the fact that the method comprises a fifth measurement of a fifth difference between a fifth value displayed by the needle and a fifth value to be displayed by the needle, the polynomial function taking the form $$\text{correction value} = A4 * \theta 4 + A3 * \theta 3 + A2 * \theta 2 + A1 * \theta + A0$$

$\theta$ being the angle displayed relative to the origin of the gauge and A0, A1, A2, A3, A4 and A5 being constants. For such a correction value, five measurement points are necessary. The correction can be further enhanced with respect to the correction value in the form $A3 * \theta 3 + A2 * \theta 2 + A1 * \theta + A0$ requiring only four measurement points. According to the present invention, it is also possible to provide more measurement points or calibration points. For example, n+1 calibration points can be used to calculate a polynomial of degree n. The more measurement or calibration points used, the more time is necessary for carrying out the calibration.

Moreover, according to a second embodiment of the present invention, this object is also achieved by a method for calibrating and/or correcting a display device having a needle, the needle being able to rotate about an axis of rotation and the needle being driven by means of a stepping motor, the calibration method comprising the following steps:

a first measurement of a first difference between a first value displayed by the needle and a first value to be displayed by the needle, a second measurement of a second difference between a second value displayed by the needle and a second value to be displayed by the needle, a third measurement of a third difference between a third value displayed by the needle and a third value to be displayed by the needle, a computation of a correction value as a function of the first difference, the second difference and the third difference, the correction value corresponding to a sinusoidal function.

Through such an embodiment of the method for calibrating and/or correcting a display device, it is advantageously possible to minimize the time necessary to carry out the calibration while reducing the error between the values displayed and the values to be displayed. The result of this is that the cost price for producing such display devices can be reduced and the number of parts produced or calibrated per unit of time can be increased.

Another preferred enhancement of the invention lies in the fact that the sinusoidal function takes the form correction value=$C1*\sin(\theta-C2)+C3$ $\theta$ being the angle displayed and C1, C2 and C3 being constants. It is thus possible to calibrate with only three measurements. Then, it is necessary to solve the three equations with three unknowns. It is particularly preferred to take a measurement at the location of a mechanical zero of the motor. It is therefore possible to determine the constant C3 easily.

A particularly preferred enhancement of the invention lies in the fact that the method comprises the following steps:
a fourth measurement of a fourth difference between a fourth value displayed by the needle and a fourth value to be displayed by the needle;
a computation of the correction value as a function of the first difference, the second difference, the third difference and the fourth difference, the correction value corresponding to a sinusoidal function,
the sinusoidal function taking the form correction value=$C1*\sin(C4*\theta-C2)+C3$ $\theta$ being the angle displayed and C1, C2, C3 and C4 being constants.

A particularly preferred enhancement of the invention according to the first and the second embodiment lies in the fact that the computation of the correction value of the display device is carried out digitally.

By such an embodiment of the method for calibrating and/or correcting a display device, it is advantageously possible to carry out the simplest possible computation of a correction value which results in a reduced cost price for producing such display devices.

Another preferred enhancement of the invention according to the first and the second embodiment lies in the fact that the difference between a value displayed by the needle and a value to be displayed by the needle is between −1° and +1° over the whole range of effective values. This error is virtually wholly due to the mechanical error due to the clearance in the motor.

Yet another preferred enhancement of the invention according to the first and the second embodiment lies in the fact that the method comprises the following steps:
during the first, second, third and fourth measurement respectively, an image of the display device is recorded with the aid of a camera,
during the first, second, third and fourth measurement respectively, an operation of digital processing of the image is carried out,
during this processing operation, the first, second, third and fourth differences are evaluated. Thus, it is advantageously possible to ensure a negligible error at the points of measurement.

Another preferred enhancement of the invention according to the first and the second embodiment lies in the fact that the method makes it possible to correct with a single procedure not only an error of alignment of the axis of the needle with respect to a display surface (that is to say for example with respect to a screen printing on the display surface illustrated for example by FIG. 2), but also an error of nonlinearity of the motor. Thus, a multitude of sources of errors can be corrected simultaneously.

Other features and advantages of the invention will emerge from reading the following description of a particular, nonlimiting embodiment of the present invention.

BRIEF DESCRIPTION OF THE DRAWINGS

The invention will be better understood by virtue of the following description which relates to preferred embodiments, given as nonlimiting examples and explained with reference to the appended schematic drawings in which.

DESCRIPTION OF THE DRAWINGS

Figure 1:
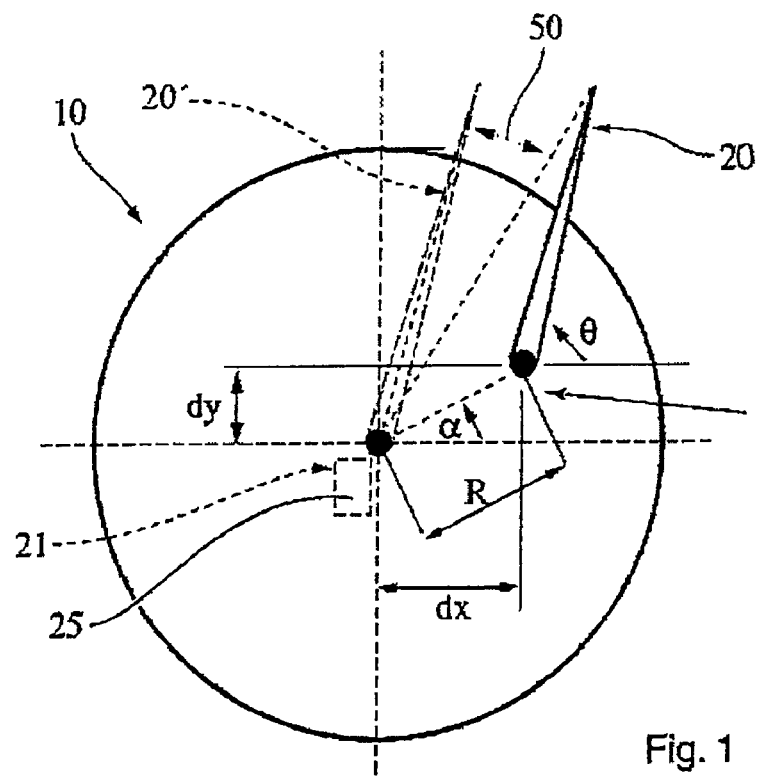
FIG. 1 is a schematic front view of a display device that can be calibrated by virtue of the calibration and/or correction method according to the present invention.

As shown in FIG. 1 of the appended drawing, a display device 10 comprises a display surface in front of which there is a needle 20. The needle 20 comprises an axis of rotation 21 and the needle 20 is rotated by means of a stepping motor 25.

FIG. 1 of the drawing shows a multitude of different sources of error particularly on the positioning of the needle 20 relative to the surface of display which result in an error (or correction value 50) between the value displayed by the needle 20 (that is to say the value indicated on the display surface in the position of the point of the needle 20 when the latter is in its real position which is indicated by the reference sign 20 in FIG. 1) relative to the value to be displayed by the needle 20 (that is to say the value indicated on the display surface in the position of the point of the needle 20 when the latter is in its theoretical position which is indicated by the reference sign 20' in FIG. 1). Among these sources of error there is in particular a movement of the center of rotation of the needle between its real position and its theoretical position, which gives rise to a movement on a vector R, having as components the movement dy on the ordinate (or the y axis) and the movement dx on the abscissa (or the x axis), the angle $\alpha$ being the angle of the vector R.

Figure 2:
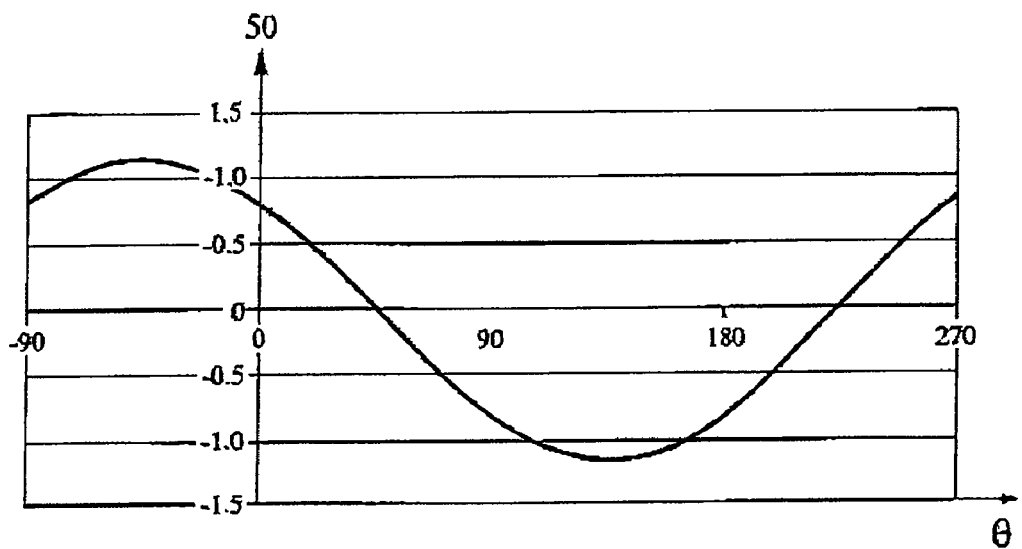
FIG. 2 is a schematic view of a diagram of the typical errors to be corrected between a value displayed by the display device on the one hand and a value to be displayed by the display device. The errors are shown as a function of the angle to be displayed by the needle.

FIG. 2 of the drawing shows schematically a diagram of the typical errors to be corrected (or correction value 50), between a value displayed by the needle 20 of the display device (that is to say the value indicated on the display surface in the position of the point of the needle 20 when the latter is in its real position) on the one hand, and a value to be displayed by the needle 20 of the display device (that is to say the value indicated on the display surface in the position of the point of the needle 20 when the latter is in its theoretical position) on the other hand. The errors (in degrees) or correction values 50 are shown as a function of the angle $\theta$ displayed by the needle 20.

It can be seen that typically a sinusoidal variation of the correction values 50 results from the positional errors of the needle 20.

Other sources of error may be taken into consideration, in particular the errors of hysteresis and of nonlinearity of the motor.

According to the first embodiment of the present invention, with the aid of a polynomial function of the third degree, it is possible to correct the values displayed with only four measurement points giving rise to a very good correction.

Other sources of errors (not shown in FIG. 2) must be taken into consideration in order to make an effective correction in all the configurations, mainly the nonlinearity of the motor. This source of error occurs if a movement command does not induce the same real movement of the needle according to its initial position. This defect of nonlinearity has a complex form, different for each motor, and cannot be corrected with a sinusoidal function.

There is a third type of error, called "smoothness", which is due to irregular movements of the rotor, to defects of magnetization, etc. This smoothness defect corresponds to vibrations that are very rapid and of small amplitudes. This defect is random, negligible for automobile applications and is not corrected by the method according to the present invention.

The calibration and/or correction method according to the present invention proposes to measure, for at least four points, the value displayed by the needle 20 of the display device 10 and to compare these values with the values to be displayed.

Then, the constants A0, A1, A2, A3, . . . An are computed by means of the differences measured between the values to be displayed and the values displayed.

With such a calibration and/or correction method according to the first embodiment, it is possible to carry out an excellent calibration and/or correction while minimizing the number of measurements to be taken during the calibration and thus to minimize the time necessary to carry out the calibration without damaging the accuracy of the needle.

According to the second embodiment of the present invention, the calibration and/or correction method according to the present invention proposes to measure, for a certain number of points, the value displayed by the needle 20 of the display device 10 and to compare these values with the values to be displayed.

Then, the constants C1, C2, C3 or C1, C2, C3, C4 are computed by means of the differences measured between the values to be displayed and the values displayed.

With such a calibration and/or correction method, it is possible to carry out an excellent calibration and/or correction while minimizing the number of measurements to be taken during the calibration.

The invention claimed is:

1. A method for calibrating and/or correcting a display device having a needle, the needle being able to rotate about an axis of rotation and the needle being driven by means of a stepping motor, the calibration method comprising the following steps: a first measurement of a first difference between a first value displayed by the needle and a first value to be displayed by the needle, a second measurement of a second difference between a second value displayed by the needle and a second value to be displayed by the needle, a third measurement of a third difference between a third value displayed by the needle and a third value to be displayed by the needle, a fourth measurement of a fourth difference between a fourth value displayed by the needle and a fourth value to be displayed by the needle, a computation of a correction value as a function of the first difference, the second difference, the third difference and the fourth difference, the correction value corresponding to a polynomial function of at least the third degree and calibrating and/or correcting the display device based on the correction value.

2. The method as claimed in claim 1, wherein the polynomial function takes the form $$\text{correction value} = A3*\theta^3 + A2*\theta^2 + A1*\theta + A0$$

$\theta$ being the angle displayed and A0, A1, A2, A3 and A4 being constants.

3. The method as claimed in claim 1, wherein the method comprises a fifth measurement of a fifth difference between a fifth value displayed by the needle and a fifth value to be displayed by the needle, the polynomial function taking the form $$\text{correction value} = A4*\theta^4 + A3*\theta^3 + A2*\theta^2 + A1*\theta + A0$$

$\theta$ being the angle displayed and A0, A1, A2, A3, A4 and A5 being constants.

4. The method as claimed claim 1, wherein the computation of the correction value is carried out digitally.

5. The method as claimed in claim 1, wherein the difference between a value displayed by the needle and a value to be displayed by the needle is between $-1°$ and $+1°$ over the whole range of effective values.

6. The method as claimed in claim 1, wherein the method comprises the following steps:
during the first, second, third and fourth measurement respectively, an image of the display device, is recorded with the aid of a camera, during the first, second, third and fourth measurement respectively, an operation of digital processing of the image is carried out, during this processing operation, the first, second, third and fourth differences are evaluated.

7. The method as claimed claim 1, wherein the method makes it possible to correct with a single procedure not only an error of alignment of the axis of the needle relative to a display surface, but also an error of nonlinearity of the motor.

8. A method for calibrating and/or correcting a display device having a needle, the needle being able to rotate about an axis of rotation and the needle being driven by means of a stepping motor, the calibration method composing the following steps; a first measurement of a first difference between a first value displayed by the needle and a first value to be displayed by the needle, a second measurement of a second difference between a second value displayed by the needle and a second value to be displayed by the needle, a third measurement of a third difference between a third value displayed by the needle and a third value to be displayed by the needle, a computation of a correction value as a function of the first difference, the second difference and the third difference, the correction value corresponding to a sinusoidal function and calibrating and/or correcting the display device based on the correction value.

9. , The method as claimed in claim 8, wherein the sinusoidal function takes the form $$\text{correction value} = C1*\sin(\theta - C2) + C3$$

$\theta$ being the angle displayed and C1, C2 and C3 being constants.

10. The method as claimed in claim 9, wherein the method comprises the following steps:
a fourth measurement of a fourth difference between a fourth value displayed by the needle and a fourth value to be displayed by the needle; a computation of the correction value as a function of the first difference, the second difference, the third difference and the fourth difference, the correction value corresponding to a sinusoidal function, the sinusoidal function taking the form $$\text{correction value} = C1*\sin(C4*\theta - C2) + C3$$

$\theta$ being the angle displayed and C1, C2, C3 and C4 being constants.

11. The method as claimed in claim 9, wherein the computation of the correction value is carried out digitally.

12. The method as claimed in claim 9, wherein the difference between a value displayed by the needle and a value to be displayed by the needle is between $-1°$ and $+1°$ over the whole range of effective values.

13. The method as claimed in claim 9, wherein the method comprises the following steps:
during the first, second, third and fourth measurement respectively, an image of the display device is recorded with the aid of a camera, during the first, second, third and fourth measurement respectively, an operation of digital processing of the image is carried out, during, this processing operation, the first, second, third and fourth differences are evaluated.

14. The method as claimed in claim 9, wherein the method makes it possible to correct with a single procedure not only an error of alignment of the axis of the needle relative to a display surface, but also an error of nonlinearity of the motor.

* * * * *